(12) United States Patent
Fleck et al.

(10) Patent No.: US 7,426,647 B2
(45) Date of Patent: Sep. 16, 2008

(54) LOW POWER MEDIA PLAYER FOR AN ELECTRONIC DEVICE

(75) Inventors: Rod G. Fleck, Bellevue, WA (US); Rex Antony Flynn, Newton, MA (US); Martin J. Kee, Sammamish, WA (US); Stephen L. Perrin, Lake Forest Park, WA (US)

(73) Assignee: Vulcan Portals Inc., Seattle, WA (US)

( * ) Notice: Subject to any disclaimer, the term of this patent is extended or adjusted under 35 U.S.C. 154(b) by 507 days.

(21) Appl. No.: 10/857,627

(22) Filed: May 28, 2004

(65) Prior Publication Data

US 2005/0066207 A1 Mar. 24, 2005

Related U.S. Application Data

(60) Provisional application No. 60/504,165, filed on Sep. 18, 2003.

(51) Int. Cl.
G06F 1/32 (2006.01)
(52) U.S. Cl. .................. 713/320; 713/300; 713/310; 713/321; 713/322; 713/323; 713/324; 713/330; 713/340
(58) Field of Classification Search .......... 713/300, 713/310, 320–324, 330, 340
See application file for complete search history.

(56) References Cited

U.S. PATENT DOCUMENTS

| 5,537,343 A | 7/1996 | Kikinis et al. |
| 5,560,022 A | 9/1996 | Dunstan et al. ............ 395/750 |
| 5,689,669 A | 11/1997 | Lynch et al. |
| 5,763,960 A | 6/1998 | Ceccherelli et al. |
| 5,768,164 A | 6/1998 | Hollon, Jr. ............ 364/710.14 |
| D416,256 S | 11/1999 | Griffin et al. |

(Continued)

FOREIGN PATENT DOCUMENTS

EP 0 945 778 9/1999

(Continued)

OTHER PUBLICATIONS

Strietelmeier, Julie, "Official Gadgeteer Hands on Review: RIM BlackBerry 950 Internet Edition," XP002322212, Feb. 26, 2001. Retrieved from Internet, URL: http://www.the-gadgeteer.com/rim-blackberry-review.html, download date of Mar. 8, 2005.

*Primary Examiner*—Nitin C. Patel
*Assistant Examiner*—Fahmida Rahman
(74) *Attorney, Agent, or Firm*—Perkins Coie LLP

(57) ABSTRACT

A low power media player is provided for an electronic device, such as a hand-held portable computer having capability to operate an application during a low power mode. During the low power mode, portions of hardware, software, services, and/or other components of the portable computer that are not necessary to the operation of the low power media player are suspended or otherwise deactivated. Rather than repeatedly accessing a hard disk to read media files for playback, the low power media player limits its number of access operations by reading as many media files as possible during each access operation, and then caching the read media files. When playback of the media files is to be performed, the media files are read from the cache, thereby reducing the amount of power consumption attributable to hard disk access operations.

24 Claims, 8 Drawing Sheets

U.S. PATENT DOCUMENTS

| | | | |
|---|---|---|---|
| 5,978,923 A | 11/1999 | Kou | |
| 6,088,809 A | 7/2000 | Atkinson | 713/324 |
| D433,460 S | 11/2000 | Griffin et al. | |
| 6,243,819 B1 | 6/2001 | Jung | 713/320 |
| 6,278,442 B1 | 8/2001 | Griffin et al. | |
| 6,392,640 B1 | 5/2002 | Will | |
| 6,396,482 B1 | 5/2002 | Griffin et al. | |
| D460,493 S | 7/2002 | Griffin et al. | |
| D461,803 S | 8/2002 | Griffin et al. | |
| 6,452,588 B2 | 9/2002 | Griffin et al. | |
| D464,995 S | 10/2002 | Griffin et al. | |
| 6,489,950 B1 | 12/2002 | Griffin et al. | |
| 6,664,991 B1 | 12/2003 | Chew et al. | |
| 6,741,232 B1 | 5/2004 | Siedlikowski et al. | |
| 6,922,759 B1 * | 7/2005 | Garritsen | 711/154 |
| 2001/0037470 A1 | 11/2001 | Teshima et al. | 713/320 |
| 2002/0087225 A1 * | 7/2002 | Howard | 700/94 |
| 2003/0023700 A1 | 1/2003 | Swinton et al. | |
| 2003/0149904 A1 | 8/2003 | Kim | 713/330 |
| 2003/0156074 A1 | 8/2003 | Ranganathan et al. | 345/1.1 |
| 2004/0003225 A1 * | 1/2004 | Cheng et al. | 713/1 |
| 2004/0268004 A1 * | 12/2004 | Oakley | 710/303 |
| 2005/0066006 A1 | 3/2005 | Fleck et al. | 709/206 |
| 2005/0066207 A1 | 3/2005 | Fleck et al. | |
| 2005/0076256 A1 * | 4/2005 | Fleck et al. | 713/320 |

FOREIGN PATENT DOCUMENTS

| | | |
|---|---|---|
| EP | 1 028 425 | 8/2000 |
| WO | WO 03/029945 | 4/2003 |

* cited by examiner

LOW POWER MEDIA PLAYER FOR AN ELECTRONIC DEVICE

CROSS REFERENCE TO RELATED APPLICATION

The present application claims the benefit under 35 U.S.C. § 119(e) of U.S. Provisional Patent Application Ser. No. 60/504,165, entitled "SOFTWARE AND HARDWARE FEATURES FOR MINI-PC," filed Sep. 18, 2003, assigned to the same assignee as the present application and which is incorporated by reference in its entirety.

TECHNICAL FIELD

The present disclosure relates generally to electronic devices, and in particular but not exclusively, relates to a low power media player for an electronic device, such as a handheld portable computer, having the capability to run applications while in a low power mode.

BACKGROUND INFORMATION

Today's computer users are highly mobile individuals. Whether on business trips, on vacations, or coming to and from work, these individuals are readily identifiable by their use of laptops, enhanced-functionality cellular telephones, Palm Pilots™, Blackberries™, and other portable electronic devices. Indeed, many establishments provide Internet connections that cater to individuals who may be merely passing through the establishment for a short period of time and who require a network connection. For instance, Internet connections are available at airports and hotels, and even in restaurants and coffee shops.

Because of the portable nature of the electronic devices, there are certain limits to their capabilities. Power consumption is one of the prime examples. Power consumption is generally a minor issue in an operating environment where the user has "plugged" the electronic device into an electrical power outlet or has docked the electronic device into a docking station. In these situations, there is constant and substantially unlimited power for operating the electronic device, thereby eliminating the need for the electronic device to consume power from an internal power source, such as an internal battery, while plugged in.

However despite the proliferation of establishments that provide Internet connections (and typically a corresponding stationary power supply), there are still many instances when a stationary power supply is unavailable to the highly mobile user. In these instances, the electronic device needs to rely on its internal battery to supply the power necessary to run applications or to perform other functions with the electronic device.

If operated in a full power mode using power from the internal battery, the electronic device can generally operate for only a few hours before the battery is drained. In fact, many different software services, software applications, and hardware can run concurrently in the full power mode using various subsystems and components in the electronic device. A display, disk drive, and processor (especially a graphics processor) are some of the components of an electronic device that can run concurrently, yet consume a substantial amount of power.

To help reduce power consumption, especially when a stationary power supply is unavailable, many electronic devices include a "standby" mode in which the electronic device turns OFF and/or substantially reduces power to all of its subsystems and components. In such a standby mode, a user generally cannot use any applications unless the electronic device is switched from the standby mode to the full power mode. As such, it can often be necessary for the user to make only limited and very efficient use of the electronic device while it is in full power mode when there are no available stationary power supplies. Furthermore, it may even be necessary for the user to keep the electronic device completely turned off or in a substantially non-functional standby mode as much as possible.

If the user fails to diligently conserve power in this manner, then the electronic device will run out of power and become unusable until the user can recharge or replace the internal battery and/or connect to a stationary power supply. For instance, repeatedly accessing a hard disk drive when running applications can dramatically reduce the amount of available power that can be delivered from an internal battery. The constant need for software applications to access the hard disk drive is an important reason for limiting or eliminating the functionality of the applications in the standby mode. This constrained operating environment is inconvenient and impractical for a highly mobile user who may wish to use a portable electronic device for certain applications when there are no available stationary power supplies.

BRIEF SUMMARY OF THE INVENTION

One preferred aspect provides a method usable for an electronic device that can operate in a low power mode. The method includes monitoring for an event representative of a transition to the low power mode. If the event is detected, the method includes activating a media player to operate during the low power mode. The method further includes reading at least a portion of a media file, to be played back during the low power mode, from a storage location. The portion of the media file read from the storage location is loaded in a memory. The loaded portion of the media file is read from the memory, and the read portion of the media file is played during the low power mode.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
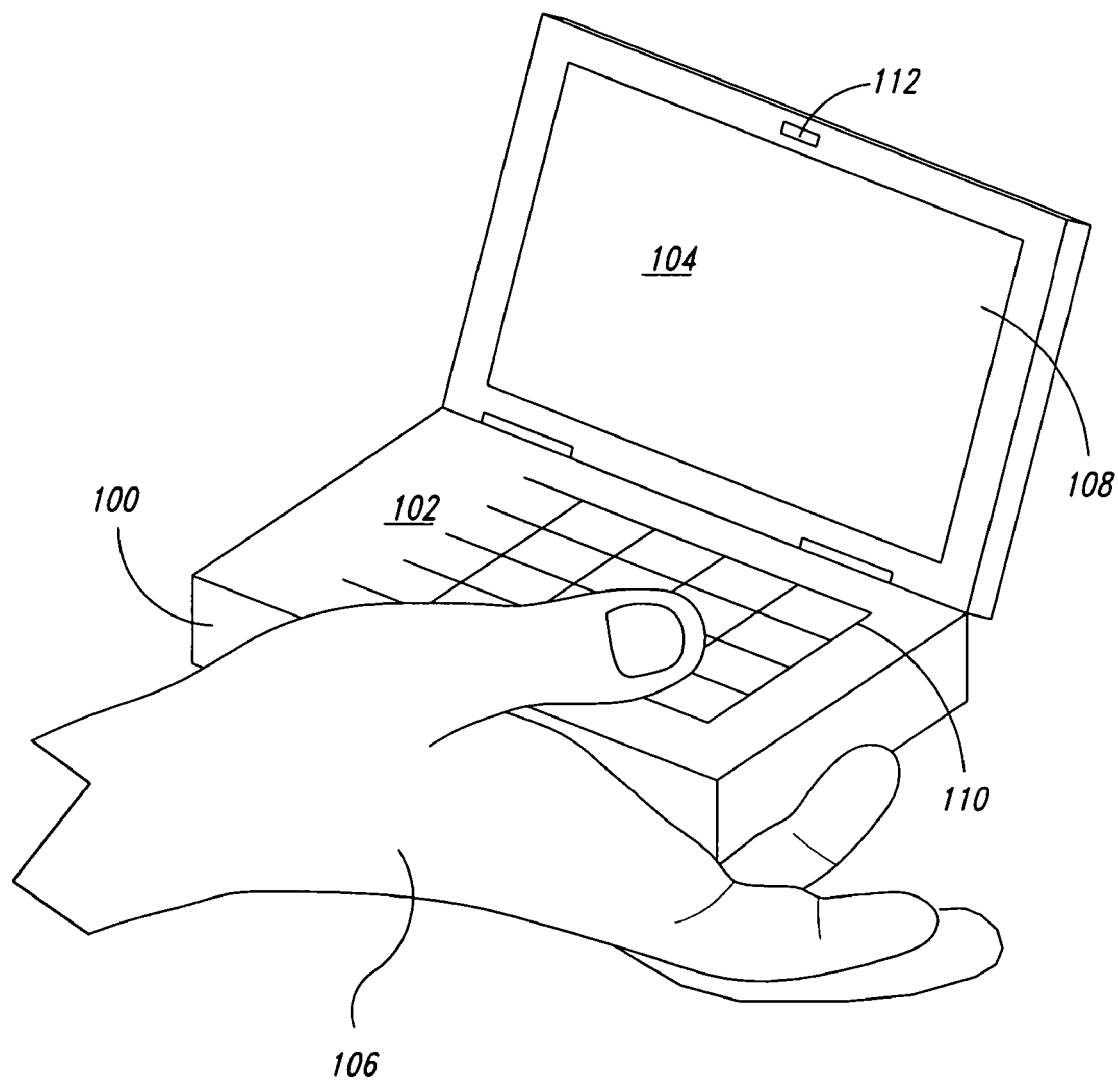
FIG. 1 is a front, top right isometric view of an example electronic device, which in this case is in the form of a handheld portable computer including a lid shown in an open position.

Embodiments of a low power media player for an electronic device, for example, a portable electronic device in the form of a hand-held portable computer are described herein. In the following description, numerous specific details are given to provide a thorough understanding of embodiments. The invention can be practiced without one or more of the specific details, or with other methods, components, materials, etc. In other instances, structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment provides a low power media player for an electronic device having the capability to operate an application during a low power mode. A non-limiting example of such an electronic device is a portable electronic device. The electronic device, according to one embodiment, comprises a hand-held portable computer. The low power media player can operate when the portable computer is in a low power mode. In this low power mode, most of the applications, services, devices, processes, and other components of the portable computer are turned OFF or otherwise powered down. However, certain applications (and the components needed to support their operation) can be selectively kept powered during the low power mode.

One such application is the low power media player. In an embodiment, the low power media player plays back media files that were previously cached or otherwise loaded in volatile memory, thereby avoiding the need to unnecessarily access a disk (or other persistent or non-volatile storage medium) to obtain the media file(s) for playback. By accessing a cache, disk access operations are minimized except when needed—this feature greatly improves power conservation during playback of the media files, as disk access operations (including turning the disk ON and searching and reading media files stored thereon) typically involve significant power usage. Because most components of the portable computer have been turned OFF during the low power mode and are thus not using the cache (or other non-persistent or volatile storage location), media files that have been cached prior to entering the low power mode and/or during the low power mode are generally not going to be overwritten from the cache, and are therefore available to be read and played back from the cache.

In an embodiment, the low power media player comprises a low power audio media player for playing back MP3, WMA, Real Audio, or other types or formats of audio files, which can include songs or other type of audio content. According to an embodiment, the low power media player can leverage existing functionality of a media player that is already installed in the portable computer. That is, an embodiment uses the installed media player for many of the operations associated with playback, including but not limited to, reading a file from a cache, decoding the file, playing, rewinding, stopping, pausing, and the like. In such an embodiment, the low power media player can take advantage of existing functionality, libraries, interfaces, and other features of the installed media player, and minimize the need to separately provide such features.

The installed media player operates in the background during the low power mode in an embodiment, and the low power media player provides control and other interface actions, such as obtaining and displaying certain associated information (e.g., playlists, titles, artists, time, etc.), controlling the installed media player's playback of files (e.g., controlling the installed medial player's play, rewind, stop, etc. operations), responding to user-entered commands from a user interface (e.g., user-entered commands to select a file for playback, rewind, turning the low power media player ON/OFF, etc.), and others.

For the sake of simplicity and illustration, at least one non-limiting embodiment of the low power media player will be described herein as a low power MP3 player, and the installed media player will be described herein as Microsoft Windows Media Player™ 9. This embodiment is representative of only one implementation and other embodiments are not limited to this implementation. For example, other embodiments are capable of operating in conjunction with WMA, Real Audio, or other types or formats of media files.

During operation of the portable computer in the low power mode, hardware, software, services, and other components of the portable computer that are not necessary for operation of the low power media player (or any other application) are suspended or otherwise deactivated. Furthermore, as each task is performed by the low power media player, the components that are not needed for subsequent tasks are deactivated and reactivated as needed, including selective activation and deactivation of the disk drive. The various deactivation operations can be performed in sequence from the highest-level components to the lowest-level components to ensure that components that are needed by other components, or that are otherwise involved in operating dependencies with other components, are not prematurely deactivated. A specific set of events can transition the portable computer out of the low power mode into some other operating mode, such as a full power mode.

Figure 2:
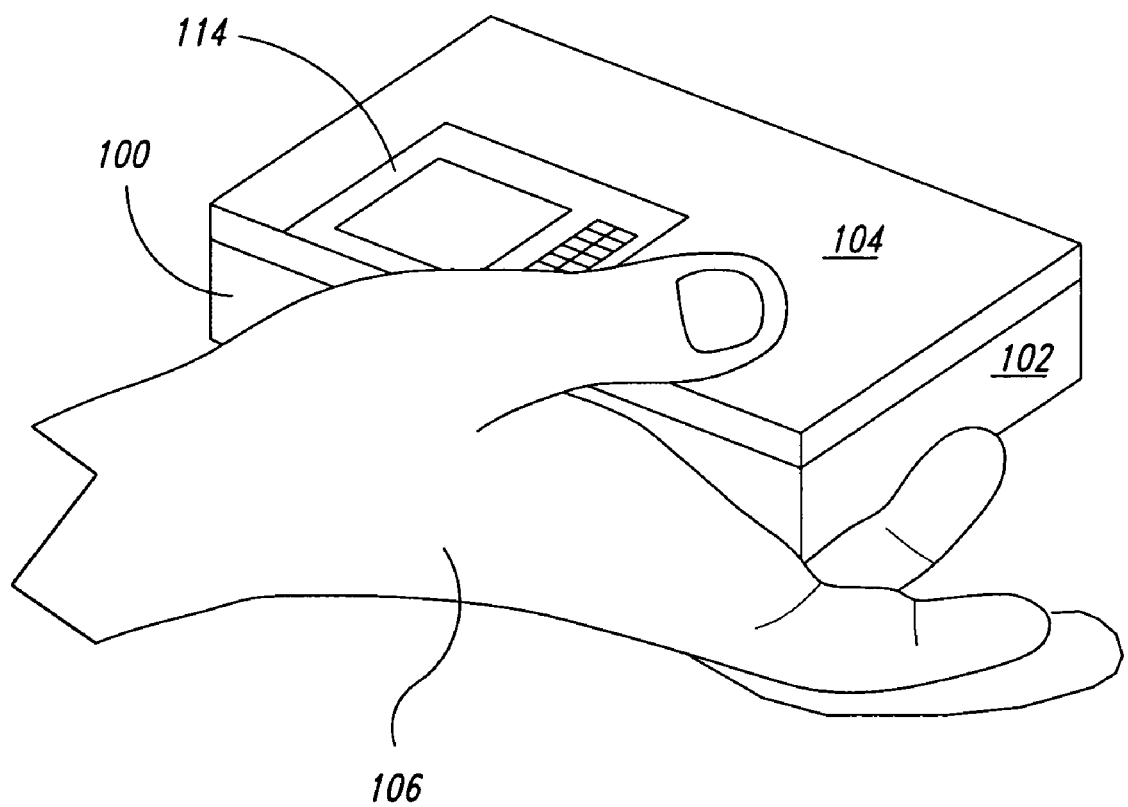
FIG. 2 is a front, top right isometric view of the example portable computer of FIG. 1 including the lid shown in a closed position.

FIGS. 1-2 show front, top right isometric views of an example electronic device, in this case a hand-held portable computer 100 in which an embodiment may be implemented. While the portable computer 100 is used as the illustrative example throughout this application, other embodiments may be implemented with devices that may not necessarily be thought of as a "computer" or with devices that may not necessarily have the same shape and appearance as the portable computer 100 illustrated in FIGS. 1-2. Examples include but are not limited to wireless communication devices, display devices, monitors, audiovideo equipment, consumer electronic devices, or other electronic devices that can implement a low power media player.

As shown, the portable computer 100 is similar in appearance to a laptop computer, in that it comprises first and second portions 102 and 104, respectively, which are hinged. The first portion 102 can include a keypad or keyboard 110 and housing for the internal electronic components (such as one or more processors, machine-readable storage media, graphics drivers, and so forth). The second portion 104 operates as a lid that folds over the first portion 102 (when in a closed position, such as shown in FIG. 2), and includes a display screen 108 for displaying information or for otherwise presenting data (such as emails, user interfaces, graphics, and the like) while the second portion 104 is unfolded to an upright position as shown in FIG. 1.

Unlike a conventional laptop computer, however, the portable computer 100 of one example embodiment is substantially smaller in size in terms of both volume and weight. For example, the portable computer 100 may be 140 mm long, 101 mm wide, and 30 mm thick (while closed), with a weight of approximately one pound. The display screen 108 on the second portion 104 may have a resolution comparable to a desktop computer monitor. In general, the size of the display screen 108, the size of the internal components (e.g., chips and circuit boards) located within the first portion 102, and the strategic placement of the internal components (e.g., density), and other factors will influence the overall form factor of the portable computer 100. As illustrated in FIGS. 1-2, the portable computer 100 has a size such that it can be held securely in a hand 106 of a user whether in the open or closed position. In another embodiment, the portable computer 100 may have a larger or otherwise different form factor and/or have a greater weight.

In one specific embodiment shown in FIG. 2, the portable computer 100 can include a low power display 114 integrated within the second portion 104. In such an embodiment, the low power display 114 be used to present certain information while the lid of the portable computer 100 is closed and the portable computer 100 is in the low power mode, or be used to present other forms of data. The low power display 114 also includes a user interface through which the user can interact with low power mode applications, trigger the portable computer 100 to transition to the low power mode, and other operations. For example, the low power display 114 can present playlists, song titles, artist information, time, or other information provided to it by the low power media player. The user interface of the low power display 114 can also allow the user to enter commands (such as play, pause, rewind, etc.) or to turn the low power media player ON or OFF.

While the low power display 114 is depicted in FIG. 2 as being positioned on the surface of the second portion 104, the low power display 114 may be positioned elsewhere on the portable computer 100. For example, the low power display 114 may be positioned on side surfaces, the bottom surface, or any combination of surfaces of the portable computer 100.

In one embodiment that will be described below, the portable computer 100 of FIG. 1 includes a lid switch 112. The lid switch 112 operates as a type of trigger to indicate whether the lid of the portable computer 100 is open or closed. Thus, for example, when the lid of the portable computer 100 is closed as shown in FIG. 2, the lid switch 112 can make physical contact with an electromechanical connection, can change orientation, can be depressed, or experience any other type of change in state that causes a signal such as an interrupt to occur. Such an interrupt can be used by an operating system, a basic input/output system (BIOS), a service, or other software component to initiate a transition from one power state to another power state (e.g., to the low power mode). The lid switch 112 can be embodied with any suitable shape, mechanism, functionality, or other operating feature.

Examples of the portable computer 100 in which embodiments of the low power mode techniques may be implemented are disclosed in U.S. patent application Ser. No. 10/338,802, entitled "SYSTEM AND METHOD FOR HEAT REMOVAL FROM A HAND-HELD PORTABLE COMPUTER WHILE DOCKED"; U.S. patent application Ser. No. 10/338,815, entitled "NAVIGATION AND SELECTION CONTROL FOR A HAND-HELD PORTABLE COMPUTER"; U.S. patent application Ser. No. 10/338,761, entitled "HEAT DISSIPATION FROM A HAND-HELD PORTABLE COMPUTER"; and U.S. patent application Ser. No. 10/338,791, entitled "KEYBOARD WITH MOUSE FOR A HAND-HELD PORTABLE COMPUTER", all filed Jan. 7, 2003, assigned to the same assignee as the present application, and all of which are incorporated herein by reference in their entireties.

Figure 3:
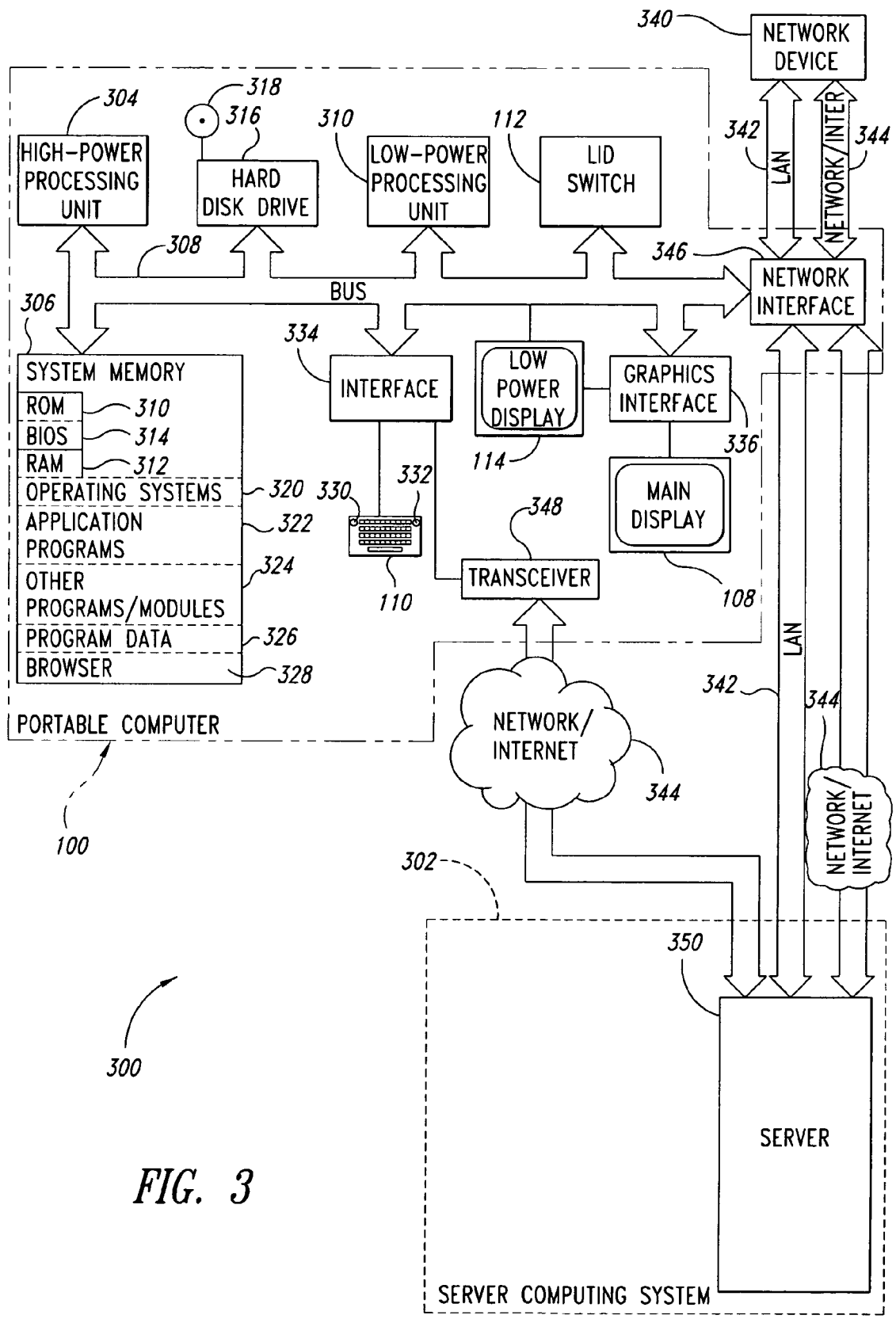
FIG. 3 is a block diagram of an embodiment of the portable computer and a representative operating environment in more detail.

FIG. 3 and the accompanying discussion provide a description of a suitable computing environment in which embodiments can be implemented. Although not required, embodiments will be described in the general context of hardware and computer-executable instructions, such as program application modules, objects, drivers, services, or macros being executed by a computer (such as by the portable computer 100). In addition to the embodiment shown in this figure, other embodiments can be practiced with other computer systems and/or network configurations.

FIG. 3 shows a computing system 300, and in particular shows an embodiment of the portable computer 100 in more detail. The computing system 300 includes the portable computer 100 and a server computing system 302. The server computing system 302 may be located at one or more network locations, for example, at one or more Internet Service Provider (ISP) locations to store and serve email information and to serve other information for the portable computer 100.

The portable computer 100 includes a high-power processing unit 304 for high-power processing, at least one system memory 306, and a system bus 308 that couples various system components, including the system memory 306, to the high-power processing unit 304. The high-power processing unit 304 may be any logic processing unit, such as one or more central processing units (CPUs), digital signal processors (DSPs), graphics processors, application-specific integrated circuits (ASICs), etc.

In an embodiment, the portable computer 100 may also include a low-power processing unit 310 for low power processing, and which may or may not necessarily operate with the same operating system as the high-power processing unit 304. For example, in one embodiment separate operating systems, memory, applications, or other components can be provided for the high-power processing unit 304 and for the low-power processing unit 310. It is also possible in an embodiment for the high-power processing unit 304 and for the low-power processing unit 310 to share certain components, rather than having separate dedicated components.

The system bus 308 can employ any suitable bus structure or architecture, including a memory bus with memory controller, a peripheral bus, and a local bus. The system memory 306 may include one or more read-only memories (ROM) 310 and one or more random access memories (RAM) 312. In one embodiment, separate ROM 310, RAM 312, and/or other memory can be dedicated for the low power display 114. A BIOS 314, for example, which can be stored in the ROM 310, contains routines that help transfer information between elements within the portable computer 100, such as during start-up. Operation of an embodiment of the BIOS 314 in connection with a low power mode will be described in further detail below.

The portable computer 100 may include a hard disk drive 316 for reading from and writing to a hard disk 318. The hard disk drive 316 communicates with the high-power processing unit 304 via the system bus 308. The hard disk drive 316 may include interfaces or controllers (not shown) coupled between such drive(s) and the bus 308. The hard disk drive 316 and its associated hard disk 318 provide nonvolatile or otherwise persistent storage of computer readable instructions, data structures, program modules and other data for the portable computer 100. Although the depicted portable computer 100 employs the hard disk drive 316 and the hard disk 318, other types of drives and computer-readable media that can store data accessible by a computer may be employed, such as compact disks (CDs), magnetic cassettes, flash memory cards, digital video disks (DVDs), Bernoulli cartridges, RAMs, ROMs, smart cards, etc. In one embodiment, the hard disk drive 316 and/or other drives are not integrated within a housing of the portable computer 100 itself, but instead are external devices that are accessible via hardwire or wireless communication interfaces.

The hard disk drive 316 can operate in conjunction with the hard disk 318 to store media files, such as MP3 files or other types of audio files. In an embodiment, these media files can be read from the hard disk 318 during a full power mode or during the low power mode, where attempts to access the hard disk 318 during the low power mode to read media files are minimized as much as possible during the low power mode.

The system memory 306 can be used for storing various program modules, such as one or more operating systems 320, one or more application programs 322 (such as an email program, the low power media player, an installed media player, or other applications that can operate in a high power mode or in a low power mode), other programs or modules 324, and program data 326. A non-limiting example of an operating system 320 that may be used is Windows XP™, which is commercially available from Microsoft Corporation of Redmond, Wash. Windows XP™ as well as other suitable operating systems used with certain embodiments may include a power management subsystem. In an embodiment, power management capabilities are provided in connection with the low power mode that supplements power management provided by the power management subsystem of the operating system 320.

The other programs/modules 324 can include libraries, application program interfaces (APIs), objects, or other components. The program data 326 can include cached data, such as cached songs or other media files, in one embodiment. As such, parts of the system memory 306 provide volatile or otherwise non-persistent memory capability, (such as an operating system cache, the RAM 312, or other cache or non-persistent storage location) for storing media files.

The program data 326 can be stored as a data structure, file, or other data format in a cache, database, or other storage unit integrated in or separate from the system memory 306. In one embodiment, the program data 326 also includes power profiles and other power management data indicative of the power requirements of particular services, software, and hardware of the portable computer 100. As will be described later, this power management data is used in one embodiment to determine which component of the portable computer 100 to keep ON or to turn OFF during the low power mode, length of time to keep ON or OFF, sequence of turning various components ON or OFF, and other parameters and settings. Further detailed discussion of the various other programs/modules 324 that interact for managing and controlling operations in the low power mode and of the application program 322 (and more specifically, some type of suitable low power mode application program) will be provided below.

The portable computer 100 may also include a web browser 328 for permitting the portable computer 100 to access and exchange data with sources such as Internet web sites, corporate intranets, extranets, and/or other networks as described below, as well as other server applications on server computers. For purposes of clarity the browser 328 is shown separately in FIG. 3. According to various embodiments, the browser 328 can comprise one of the application programs 322, one of the other programs/modules 324, and/or may be integrated in some manner with the operating system(s) 320. While shown in FIG. 3 as being stored in the system memory 306, the operating systems 320, application programs 322, other programs/modules 324, program data 326, and browser 328 can be stored on the hard disk 318 of the hard disk drive 316 and/or other computer-readable media in another embodiment. Moreover, the various elements depicted as being stored in the system memory 306 need not necessarily reside on the same physical memory. For example, in embodiments where the low-power processing unit 310 and the low power display 114 can be operatively detached from the portable computer 100 or otherwise operate independently of other components of the portable computer 100, separate memory (having an operating system, RAM, ROM, applications, and other elements stored thereon) can be operatively decoupled from the portable computer 100 along with the low-power processing unit 310 and the low power display 114. In such an embodiment, the decoupleable components can be integrated in a low power display module (LPDM).

A user can enter commands and information into the portable computer 100 through one or more input devices (such as the keyboard 110) and a pointing device (such as a mouse 330 that may be, for example, built into the keyboard 110, an example embodiment of which is disclosed in U.S. patent application Ser. No. 10/338,791), or through such other types of devices usable for providing user input. Alternatively or additionally, the mouse 330 can be embodied as a touch pad as compared to physical buttons. Another input device may take the form of one or more buttons 332 on the side of the keyboard 110, with the button(s) 332 usable for scrolling and clicking via turning and pressing of the button(s) 332. Other possible input devices can include a microphone, joystick, game pad, scanner, etc. (not shown). These and other input devices are connected to the high-power processing unit 304 through an interface 334 such as a serial port interface that couples to the bus 308, although the portable computer 100 may employ other interfaces such as a parallel port, a game port or a wireless interface or a universal serial bus (USB). The interface 334 can be any suitable communication interface to the bus 308 and need not necessarily be a port per se. In one embodiment, the input devices such as a mouse, joystick, game pad, keyboard, etc. are integrated directly into the housing of the portable computer 100, rather than or in addition to being coupleable via a serial or parallel port interface.

The display screen 108 operates as the main display and is coupled to the bus 308 via a graphics interface 336, such as a video adapter or other graphics component that will allow video and other graphics to be rendered on the display screen 108. The low power display 114 (and its associated user interfaces) may also be present in one embodiment to allow presentation of data (e.g., presentation on the outside surface of the second portion 104 of the portable computer 100) during the low power mode, when the lid is closed on the portable computer 100. The low power display 114 may be coupled to the bus 308 by way of the graphics interface 336 (or other interface) or may be directly coupled to the bus 308. The low power display 114 can provide its user interface with various controls, such as buttons and menus, which may be used to control various aspects of operation of the low power media player. Also as depicted in FIG. 3, the lid switch 112 can be coupled to the system bus 308 to allow the various components of the portable computer 100 to detect and respond to a closing or opening of the lid of the portable computer 100.

The portable computer 100 can operate in a networked environment using logical connections to one or more remote computers and/or devices external to the portable computer 100, such as the server computing system 302 and a network device 340, such as a printer or network storage unit. The portable computer 100 is logically connected to one or more remote computing systems or devices under any suitable method of permitting computers to communicate, such as through a wireless local area network (WLAN) 342, a wireless wide area network (WWAN), or any other network 344, including wired and wireless networks that use or can communicate with the Internet (e.g., World Wide Web). Various embodiments can be implemented to communicate with several types of communication networks, including but not limited to, telecommunications networks, cellular networks, paging networks, wired and wireless enterprise-wide computer networks, intranets, extranets, the Internet, and other types of networks. Examples of wireless systems and protocols with which the portable computer 100 can communicate, include but are not limited to, Wi-Fi, Bluetooth, 802.11, and others.

When used in a LAN networking environment, the portable computer 100 can be connected to the LAN 342 through an adapter or network interface 346 (communicatively linked to the bus 308). When used in a WWAN or other network 344, the portable computer 100 may include a modem, transceiver 348 or other device, such as the network interface 346, for establishing communications over this networking environment or for otherwise communicating with external devices. The transceiver 348 as shown in FIG. 3 is communicatively linked between the interface 334 and the network 344. The transceiver 348 may be one or more transmitters, receivers, or other communication devices that are compliant with, for example, 802.11, GPS, Bluetooth, cellular (TDMA, FDMA, and/or CDMA), Wi-Fi, virtual private network (VPN), and/or other communication standards or techniques.

In one embodiment, the portable computer 100 is communicatively linked to the server computing system 302 through the LAN 342 and/or the network 344 with transmission control protocol/Internet protocol (TCP/IP) middle layer network protocols or other network protocol layers, such as User Datagram Protocol (UDP). The network connections shown in FIG. 3 are only some examples of establishing communication links between computers, and other links can be used, including both hardwire and wireless links.

The server computing system 302 includes one or more servers 350. In the context of email, the server 350 can comprise an email server. An example of such a server is a Microsoft Exchange™ server, and the principles described herein are not to be limited to only email implementations that use a Microsoft Exchange™ server.

Figure 4:
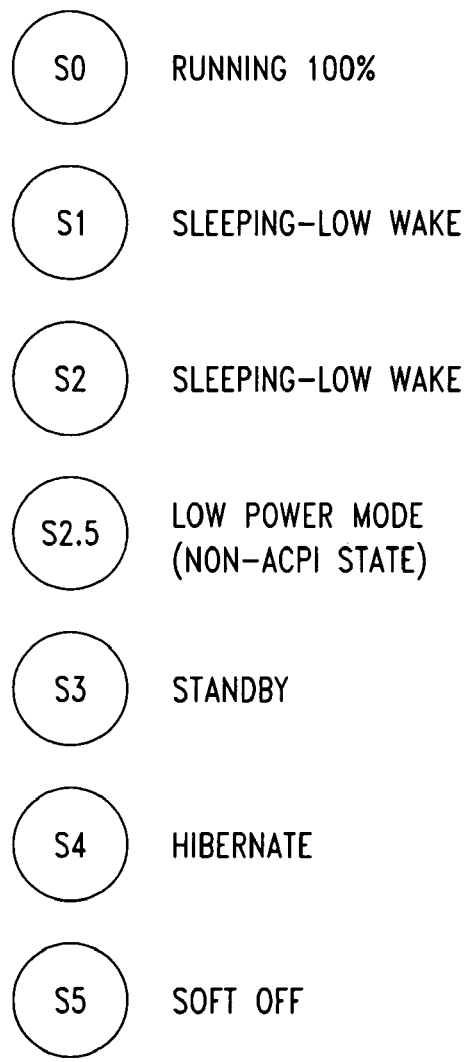
FIG. 4 is a diagrammatic representation of power states in accordance with one embodiment.

FIG. 4 is a diagrammatic representation 400 of power states in accordance with one embodiment. More particularly, FIG. 4 shows operating power states S0-S2 and S3-S5 that are supported by the Advanced Configuration and Power Interface (ACPI) specification and a non-ACPI-defined low power mode state S2.5 in accordance with one embodiment. Typically, the S0-S2 and S3-S5 power states are defined in power profiles that are integrated as part of a power management subsystem (such as a Windows power management subsystem) in the operating system 320. For the sake of brevity, only a summary of the ACPI power states will be provided herein. Further details of the ACPI power states can be found in Compac Computer Corporation et al., "Advanced Configuration and Power Interface Specification," Revision 2.0c, Aug. 25, 2003. Moreover, another embodiment of the invention can be based on power states that are not necessarily compliant with the ACPI specification.

In the S0 power state, the high-power processing unit 304 is executing instructions at its full clock speed, and the portable computer 100 is otherwise operating at substantially full (e.g.,100%) capacity. For instance, many services are operational and performing their tasks, data is being written to and read from the hard disk drive 316, the main display screen 108 is rendering content, and other working state tasks are being performed.

The S1 power state is a sleeping-low wake mode. In the S1 power state, the high-power processing unit 304 (or other processing unit) is not executing instructions. Processor context is maintained, and all system clocks and memory are in refresh. The S2 power state is also a sleeping-low wake mode that is logically lower than the S1 power state, and is assumed to conserve more power. The processor context is not maintained, and the clock of the high-processing unit 304 is stopped. Moreover, all system clocks, cache(s) and memory are in refresh, and all power resources that supply a system-level reference of S0 or S1 are in the OFF state. The S1 and S2 power states are low wake modes in that any interrupt (such as the pressing of a key on the keyboard 110) generally awakens or transitions the portable computer 100 from these modes.

The S3 power state is a standby mode and is logically a lower power state than the S2 power state. Memory is continuously running and refreshed, and so the data context of the RAM 312 is maintained, for instance. However, the high-power processing unit 304, components associated with the graphics system, the hard disk drive 316, the main display screen 108, and other components of the portable computer 100 are turned OFF and no services are running. In one embodiment, a few specific actions awaken the portable computer 100 from the S3 power state, such as pressing a power button, opening the lid of the portable computer 100 (thus activating the lid switch 112), and the receipt of a wake-on-LAN/USB/fax signal.

In the S4 power state, the portable computer 100 is in a hibernate mode. The data context of the RAM 312 is not maintained, and most components are turned OFF and not running. The S5 power state is logically the lowest power state, and is a soft OFF mode that requires a complete boot-up when awakened.

In accordance with an embodiment, an intermediate power state is provided between the S2 and S3 power states. This is a low power mode and non-ACPI-defined power state, which is labeled in FIG. 4 as the power state "S2.5." The label "S2.5" is used herein merely for the sake of convenience and ease of explanation and to provide context, and is not intended to limit the invention to strictly an ACPI environment.

In an embodiment of the S2.5 power state, most of the components of the portable computer 100 are turned OFF. However, a low power mode application is operating, and the various components of the portable computer 100 that are required to support operation of that low power mode application are selectively ON or otherwise running, until such components are no longer needed during operation of the low power mode application (in which case such components are then turned OFF). The speed of the clock in the high-power processing unit 304 is also reduced to a minimum low speed to support the low power mode application. For instance, the speed of the clock during the low power mode can be set to a minimum speed that is specified for the high-power processing unit 304, a non-limiting and purely illustrative example of which is approximately 433 MHz. As such, for transitioning to and operating in the S2.5 power state, the sequence and duration of turning OFF certain unnecessary components can minimize power consumption. Moreover, the portable computer 100 will not be awakened from the S2.5 power state by any basic interrupt (as contrasted with the S1 or S2 power states). Rather, only specific events will cause a transition to a higher power state (e.g., S0), such as opening the lid of the portable computer 100. Further details of low power mode operation in the S2.5 power state, including transitioning to and from the low power mode, are provided below.

Figure 5:
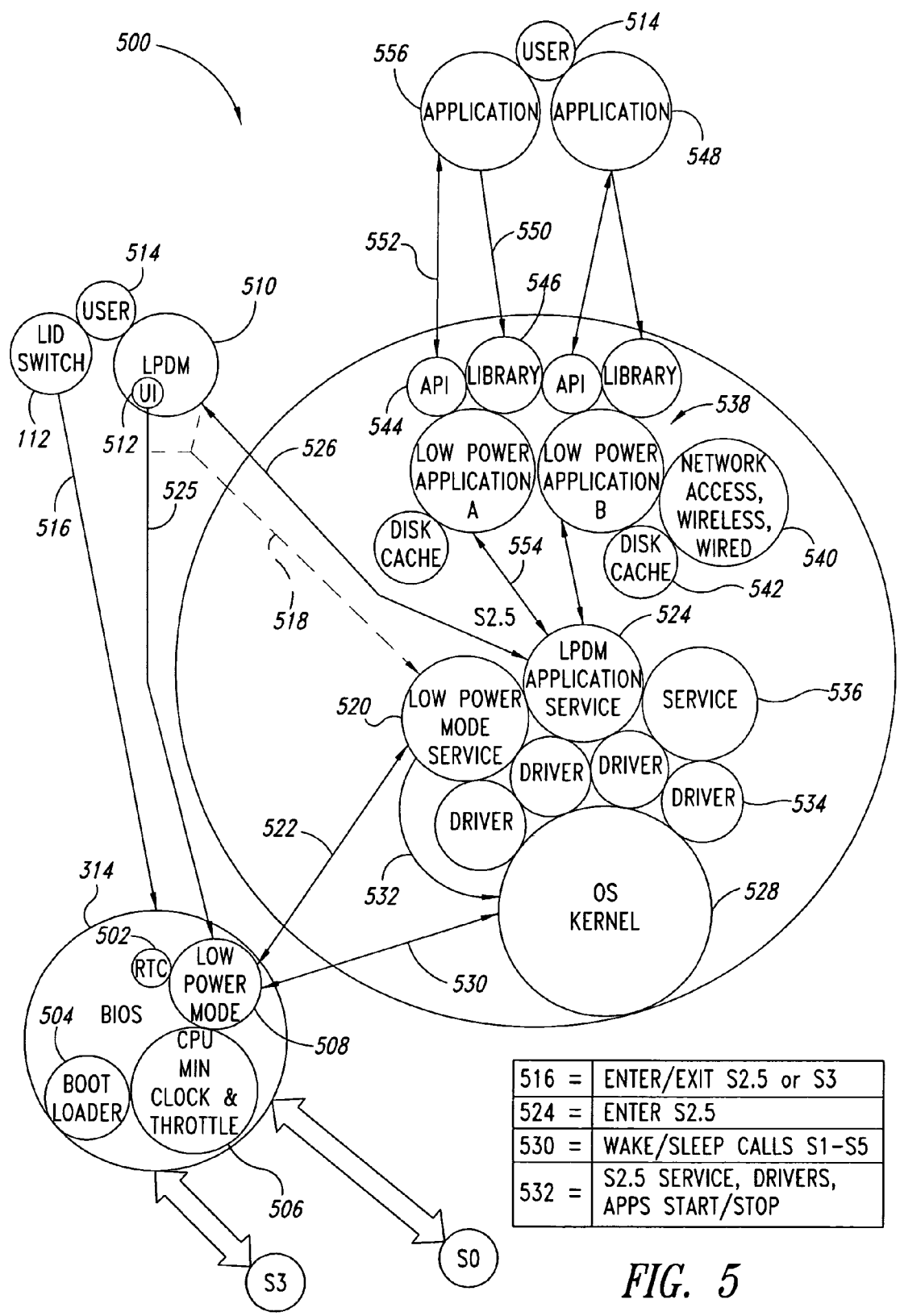
FIG. 5 is a diagrammatic representation of interaction and operation of various components of the portable computer in view of the power states of FIG. 4, according to one embodiment.

FIG. 5 is a diagrammatic representation 500 of interaction and operation of various components of the portable computer 100 in view of the power states of FIG. 4, according to one embodiment. More particularly, the diagrammatic representation 500 illustrates operation in the low power mode (i.e., the S2.5 power state) in more detail.

The BIOS 314 includes a real time clock (RTC) 502, a bootloader 504, and a CPU minimum clock and throttle 506. According to one embodiment, the BIOS 314 includes a low power mode subsystem 508, which interacts with other low power mode components to control and manage transitions to and from the S2.5 power state, and to manage and control the turning of certain components (generally hardware-related components) OFF or ON in connection with low power mode operation. The low power mode subsystem 508 can be embodied in software source code, software object code, or other machine-readable instructions. Furthermore, the BIOS 314 can control and manage transitions into and out of the S0 and S3 power states, as indicated in FIG. 5.

Transitioning or otherwise entering into the S2.5 power state (or also entering the S3 power state) according to one embodiment can be performed by closing the lid of the portable computer 100, thereby triggering or otherwise activating the lid switch 112. Additionally, exiting the S2.5 power state (or also exiting the S3 power state) can be performed by opening the lid of the portable computer 100, which also triggers a change in state of the lid switch 112. An arrow 516 in FIG. 5 represents the entering into and exiting from the S2.5 power state. The arrow 516 indicates that the entering/exiting may be performed by a BIOS call, an interrupt, or other communication to the BIOS 314 from the lid switch 112. When entering the low power mode of the S2.5 power state, the low power mode subsystem 508 of the BIOS 314 then wakes up a low power mode service 520 (indicated by an arrow 522). Alternatively or additionally, a broken arrow 518 represents that the transition to or from the S2.5 power state can be performed by a direct communication (as a result of activation of the lid switch 112) to the low power mode service 520 from the lid switch 112.

In an embodiment, entering the S2.5 power state also can be performed via a low power display module (LPDM) 510 that includes the low power display 114. The LPDM 510 includes a user interface 512 (which can be embodied as controls, buttons, or menus on the low power display 114) that can communicate (indicated with an arrow 525) with the low power mode subsystem 508 of the BIOS 314 to initiate transition into the S2.5 power state. Alternatively or additionally, the user interface 512 can communicate directly with the low power mode service 520 (also represented by the broken arrow 518) to initiate transition into the S2.5 power state. Further alternatively or in addition, the LPDM 510 (including its user interface 512) can communicate with an LPDM application service 524 (indicated by an arrow 526) to initiate transition into the S2.5 power state or to otherwise present information during the low power mode (such as playback of media files or presentation of email on the low power display 114). A user 514 can operate the lid switch 112 or the LPDM 510 to trigger transition into an applicable power state.

In an embodiment, the user interface 512 can operate in conjunction with a low power media player, such as a low power MP3 player or other low power media player. Thus, the user interface 512 can display information such as playlists, song titles, track number, time remaining to completion of playback, length of song, artist names, and other information associated with a media file. Furthermore, the user interface 512 can provide a user with controls such as playback, pause, stop, rewind, increase volume, skip, and the like. As represented by the arrows 518 or 526, these user commands can then be conveyed by the user interface 512 to the low power mode service 520, to the LPDM application service 524, and/or even directly to the low power media player.

The low power mode service 520 of one embodiment comprises a service, program, component, subroutine, module, or other software code or set of machine-readable instructions that is always running. In the S0 power state, the low power mode service 520 is running but is basically performing a minimal amount of tasks, or more specifically, the low power mode service 520 is monitoring for certain activities that signal a need to transition to the S2.5 power state. An example of such a monitored activity is activation of the lid switch 112, which indicates a closing or opening of the lid of the portable computer 100.

When the lid is closed or some other activity signals a need to transition to the low power mode of the S2.5 state, the low power mode service 520 wakes up or otherwise becomes more active, and determines which low power mode application is to be made active in the low power mode (if any); determines the hardware, software, and power needs for that low power mode application from information provided by the low power mode application and/or from power profiles comprising part of the program data 324; communicates with either or both the BIOS 314 or with an operating system kernel 528 (as indicated by an arrow 532) to turn certain elements OFF in a specific sequence; or otherwise performs tasks associated with operating the portable computer 100 in the low power mode. The arrow 522 also represents this communication to the BIOS 314 by the low power mode service 520, and an arrow 532 represents the communication to the operating system kernel 528 by the low power mode service 520. The operating system kernel 528 and/or the BIOS 314 can then selectively begin powering down unnecessary hardware, software, services, and other elements. In the context of email in one embodiment, the arrow 522 also represents the turning ON and OFF of the low power mode subsystem 508 of the BIOS 314, to allow activation and deactivation of elements of the portable computer 100 (such as the transceiver 348) that are used for periodic polling of an external server (such as the server 350) for new email.

In an embodiment, the low power mode service 520 sends a suspend-until-resume (as compared to suspend-until-interrupt) message to either or both the operating system kernel 528 and the BIOS 314, so as to suspend tasks that are not needed or unused during the low power mode. When a resume signal is sent from the low power mode service 520, the suspended tasks are resumed from the point where they were suspended. It is noted that an embodiment removes these tasks from suspension with a resume signal, as compared to an interrupt. An interrupt often removes elements from a standby state in existing systems. However, with an embodiment, interrupts are generated while operating in the low power mode, and therefore, resume signals rather than interrupts are used to remove elements from suspension to ensure that such elements remain suspended during the low power mode and do not perform unnecessary tasks (and therefore unnecessarily consume power).

The low power mode service 520 can comprise part of the program/modules 324 shown in FIG. 3. In one embodiment, the low power mode service 520 comprises a service that can be written using the Microsoft Win32 Software Development Kit (SDK), so as to allow the service to interact and interface with the operating system kernel 528. The operating system kernel 528, such as a Windows XP™ kernel, can in turn comprise part of the overall operating system 320.

In the case of the operating system kernel 528, it can make calls to the BIOS 314 to turn ON or turn OFF certain elements during the S1-S5 power states, as represented by an arrow 530. In one embodiment, this includes direct BIOS calls to the low power mode subsystem 508 to turn OFF certain hardware elements that are not necessary for the low power mode. Alternatively or additionally, the operating system kernel 528 can turn OFF certain software elements, such as unnecessary services 536 or applications, by turning OFF their corresponding drivers 534. The operating system kernel 528 can also selectively turn ON such services 536 or applications by activating their drivers 534.

In an embodiment operating in the low power mode, the low power mode service 520 and/or the LPDM application service 524 interacts with one or more low power mode applications 538 (indicated as a low power media player 538A and at least one other low power application 538B in FIG. 5). A non-limiting example of the low power application 538B is a client-side email program, such as disclosed in U.S. application Ser. No. 10/841,222, entitled "METHOD AND SYSTEM FOR MANAGING EMAIL ATTACHMENTS FOR AN ELECTRONIC DEVICE," filed May 7, 2004; U.S. application Ser. No. 10/841,229 issued as U.S. Pat. No. 7,290,034, entitled "METHOD AND SYSTEM FOR POLLING AND CACHING EMAILS FOR AN ELECTRONIC DEVICE," filed May 7, 2004; and U.S. application Ser. No. 10/841,231, entitled "METHOD AND SYSTEM FOR EMAIL SYNCHRONIZATION FOR AN ELECTRONIC DEVICE," filed May 7, 2004. All of these patent applications are assigned to the same assignee as the present application and are incorporated herein by reference in their entireties.

There may also be some type of network access component 540 (either or both wireless or wired) that can be selectively activated during the low power mode. Examples of the network access component 540 include the transceiver 348 or the network interface 346. The low power mode applications 538 and the network access component 540 can access a disk cache 542 or other suitable volatile memory location as needed during the low power mode, wherein the disk cache 542 can comprise part of the RAM 312 or other storage unit.

The low power mode applications 538 can communicate with installed applications 548 and 556 during the low power mode. Examples of these installed applications include Windows Media Player™ 9 and Microsoft Outlook™ 2003. In an embodiment, these installed applications 548 and 556 provide supporting functions and data for the low power mode applications 538 during the low power mode. As an example, if the installed application 556 is Windows Media Player™ 9, then the low power media player 538A can interact with the installed application 556, via an application program interface (API) 544 or other suitable means for communicating information between the low power media player 538A and the installed application 556, to use the play, stop, fast forward, pause, rewind, or other functions of the installed application 556. An arrow 552 represents this interaction. Use of these existing functions of the installed application 556 by one embodiment avoids the need to create code for the low power media player 538A to perform the same functions.

Information such as playlists, songs, titles, artists, time, etc. is maintained by the installed application 556 (depicted by an arrow 550) in one or more libraries 546, which is in turn accessible by the low power media player 538A. Arrows 554 and 526 represent that this library information can be forwarded by the low power media player 538A to the LPDM application service 524 and then to the LPDM 510 for presentation on the low power display 114. Thus, an embodiment of the LPDM application service 524 is usable for communicating information between the low power media player 538A and the LPDM 510.

Figure 6:
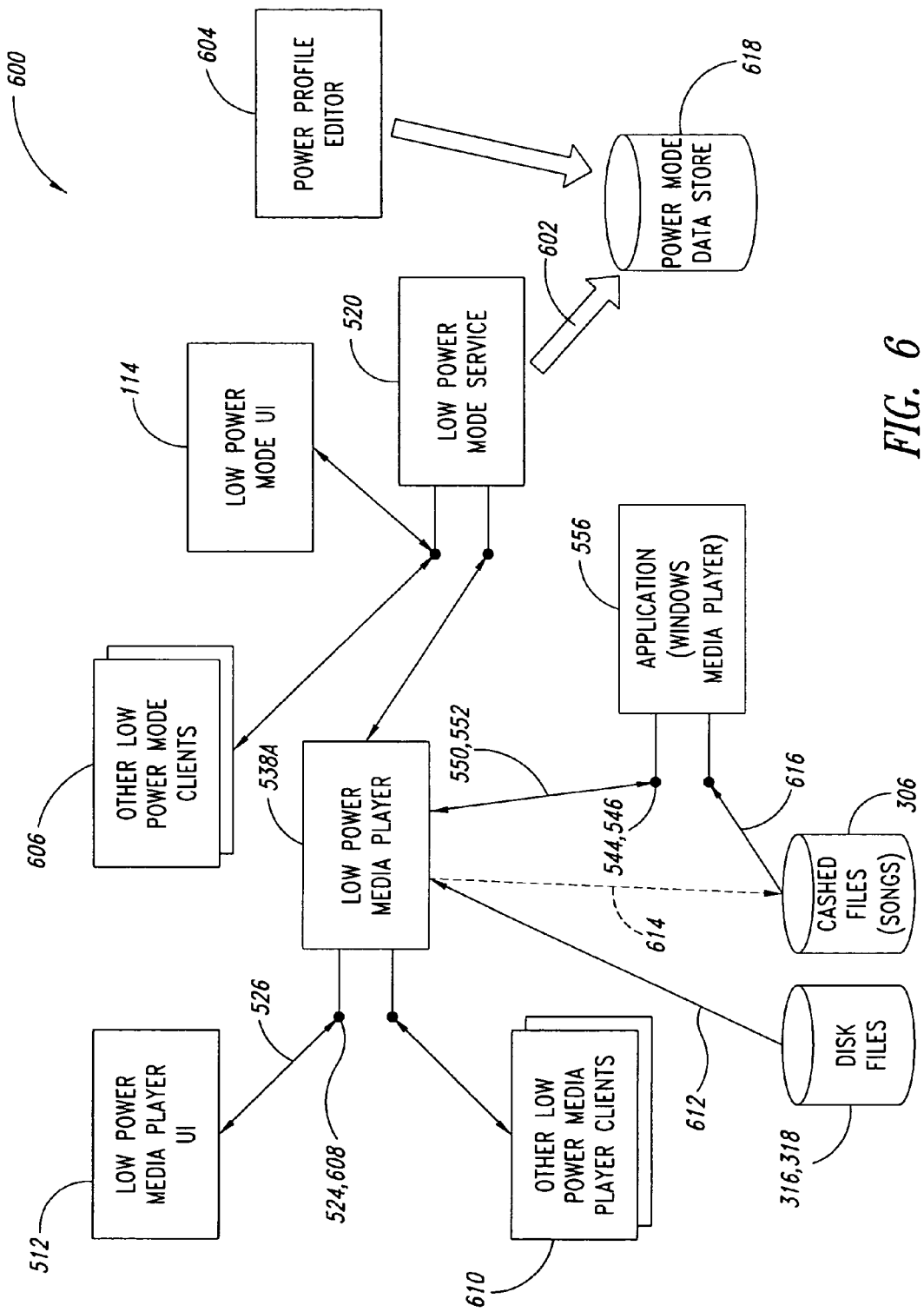
FIG. 6 is a block diagram that illustrates operation of a low power media player in conjunction with other components of the portable computer, according to one embodiment.

FIG. 6 is a block diagram 600 that illustrates operation of a low power media player 538A in conjunction with other components of the portable computer 100, according to one embodiment. Certain elements from the diagrammatic representation 500 of FIG. 5 are also shown in the block diagram 600 so as to provide context.

First, the low power mode service 520 is shown. The low power mode service 520 uses information from a power mode data store 618, which includes the program data 326 shown in FIG. 3 to determine which elements of the portable computer 100 should be kept turned ON or turned OFF, and to determine the power needs of certain elements for certain applications or operations. The sequence and duration for turning such elements ON or OFF can be stored in and obtained from the power mode data store 618. In an embodiment, the power mode data store 618 can include information such as the power requirements of the low power media player 538A, identification of the resources that need to be turned ON during operation of the low power media player 538A, power requirements of such resources, when such resources need to be turned ON/OFF and any corresponding duration, and other information associated with operation of the low power media player 538A. An arrow 602 represents the capability of the low power mode service 520 to obtain this information from the power mode data store 618. A power profile editor 604 or other tool can be provided to add, modify, or remove any of the power profile information in the power mode data store 618.

The low power mode service 520 can control or otherwise communicate with a plurality of different clients 606. Such clients 606 can include the low power media player 538A and the low power display 114 (or other low power mode user interface).

In an embodiment, the application 556 comprises a media player application that is installed in the portable computer 100. An example is the Windows Media Player™ 9, and other suitable examples can include RealPlayer™, WinAmp™, Musicmatch™, and the like. As will be described below, the application 556 operates normally during the full power mode, and is then transitioned into an embedded mode by the low power media player 538A during the low power mode. In this embedded mode, the application 556 still operates to playback media files, but is controlled by an embodiment of the low power media player 538A, wherein the low power media player 538A controls and uses the functionality of the application 556 for performing playback and related operations. Thus, one embodiment of the low power media player 538A itself does not perform the playback (e.g., decoding, sending to speakers, and the like) of the media file. In another embodiment, a low power media player 538A may be provided that performs the playback and minimally uses functionality of the application 556.

The API 544 and library 546 are symbolically represented in FIG. 6, wherein the API exposes certain functions or features of the application 556 to the low power media player 538A. These exposed functions and features can include functions for play, stop, pause, rewind, and the like, thereby allowing the low power media player 538A to control the application 556 during the low power mode. Through the library 546, the low power media player 538A can obtain information such as playlists, artists, titles, and the like from the application 556.

Through the LPDM application service 524 and/or an API 608, the low power media player 538A can communicate with the user interface 512 of the LPDM 510. The API 608 of one embodiment includes five component object model (COM) objects comprising Player, Library, Playlist, MediaItem, and StringCollection objects, for example. Among other features, the Player object provides core controls on the low power media player 538A; the Library object contains all of the accessible Playlists; the Playlist object(s) denote a sequence of MediaItems; a MediaItem object provides access to information about a particular media file; and the StringCollection object is a sequence of strings that can be used to obtain a list of albums, artists, etc. from the Library object.

In the case of the API 608, the API 608 exposes several functions of the low power media player 538A to the user interface 512, thereby allowing user-entered commands (including song selections) to be sent to the low power media player 538A, which can then convey these commands to the application 556. Through the LPDM application service 524 and/or the API 608, information such as playlists can be sent from the low power media player 538A to the user interface 512 for display thereon.

There may be other clients 610 with which the low power media player 538A interacts during its operation in the low power mode. Some of these clients 610 include the hard disk drive 316, the hard disk 318 (shown separately from the clients 610 in FIG. 6), and a low power email client (as described and claimed in U.S. patent application Ser. No. 10/871,870, entitled "LOW POWER EMAIL FUNCTIONALITY FOR AN ELECTRONIC DEVICE," filed Jun. 17, 2004, assigned to the same assignee as the present application, and incorporated herein by reference in its entirety. In an embodiment, the low power mode player 538A uses the information provided from the application 556 to determine which song is currently playing and which songs are next in the playlist. While a song is currently being played by the application 556, the low power media player 538A accesses the hard disk drive 316 and hard disk 318 to read the songs remaining on the playlist, as depicted by an arrow 612.

This reading operation inherently causes the operating system 320 to store the read copies into an operating system cache (as symbolically depicted by a broken arrow 614), such as the RAM 312 or other non-persistent or otherwise volatile storage location in the system memory 306 usable for storing a portion of a media file as the portion is read from the hard disk drive 316 or other persistent memory location. After the application 556 has completed playing the current song, the application 556 accesses the system memory 306 to read the cached songs, as depicted by an arrow 616, rather than accessing the hard disk drive 316 and hard disk 318.

Accessing the cached songs from the operating system cache, rather than via the hard disk drive 316 and hard disk 318, is beneficial for power conservation purposes in a number of ways. First, the application 556 typically has to access/read the hard disk drive 316 and hard disk 318 repeatedly to obtain individual or multiple segments of each media file, including segments of the currently playing media file as it is played. Thus, multiple disk access operations need to be performed to search for and obtain all pieces of a complete media file. These multiple disk access operations to obtain all pieces of all media files from an entire playlist result in significant power consumption. An embodiment reduces or removes the need for such multiple disk accesses during the low power mode.

Second, by instead performing a substantially single (or otherwise relatively limited number of) disk access operation(s) for a relatively short duration of time to read all media files, an embodiment reduces the amount of searching and reading of the hard disk 318 that needs to be performed—once read, the media files remain in the operating system cache and can be read directly therefrom by the application 556, instead of having to search for and read the files from the hard disk 318, since many applications by default read from a cache before reading from a hard disk.

Third, because the portable computer 100 is in a low power mode in which most of its components (e.g., applications) have been turned OFF (with the exception of the low power media player 538A), the data in the operating system cache is substantially guaranteed to be present and not overwritten by data from another application. This feature, again, contributes to power conservation since the need to access the hard disk 318 is reduced.

Figure 7:
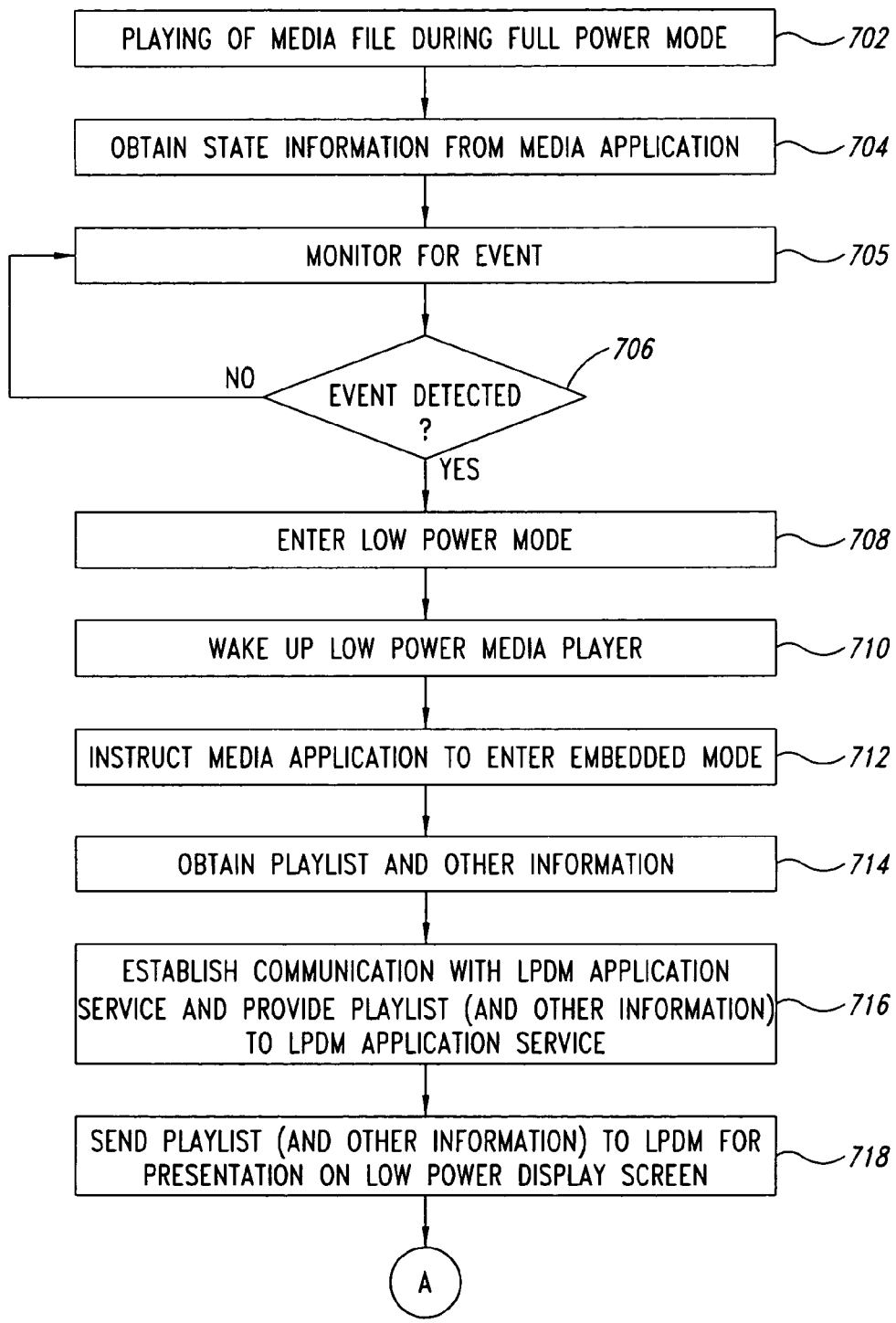
FIGS. 7-8 provide a flowchart illustrating operation of the low power media player according to one embodiment.
Figure 8:
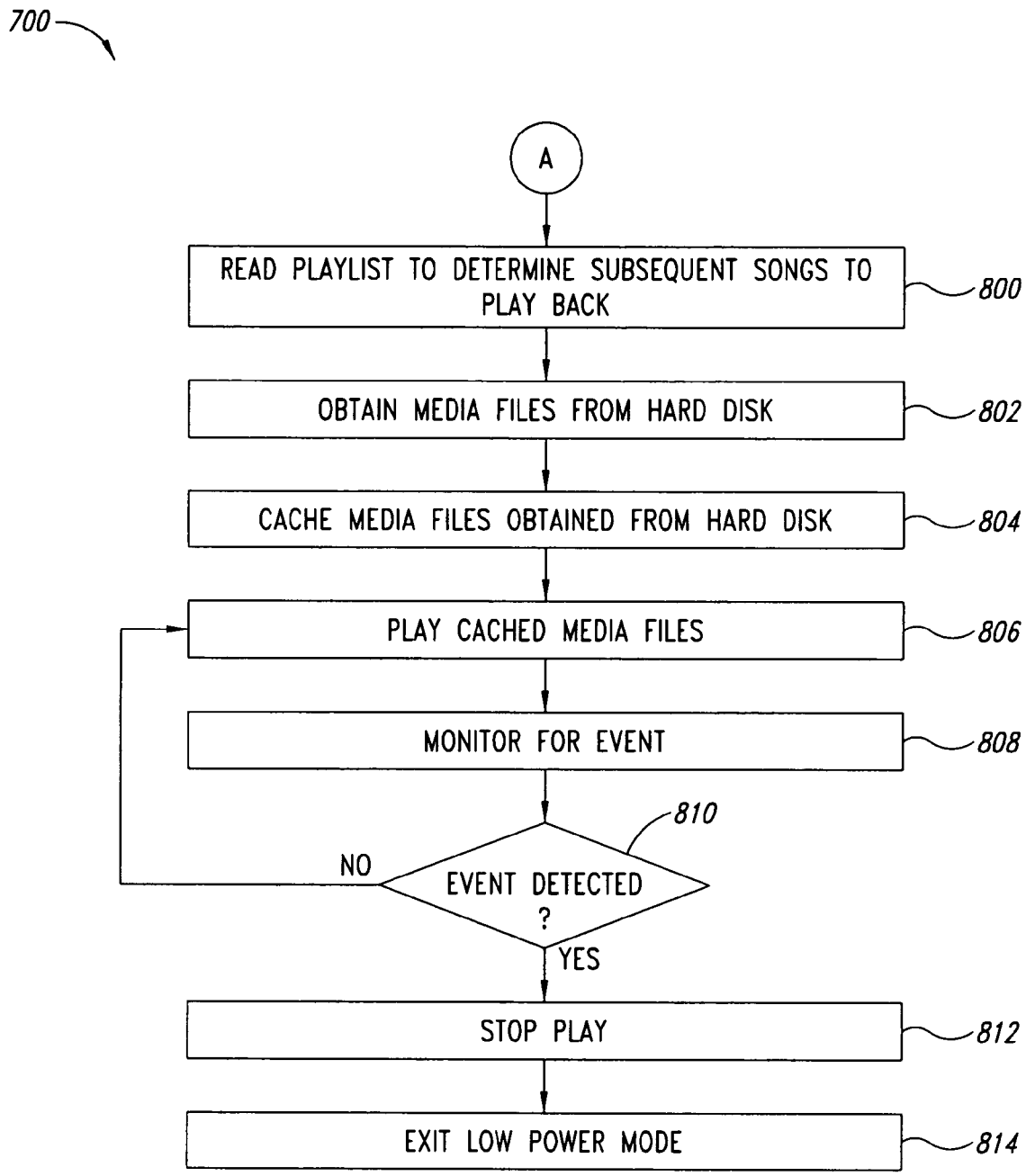

FIGS. 7-8 provide a flowchart 700 illustrating operation of the low power media player 538A according to one embodiment. Features represented by the flowchart 700 can be embodied in software source, software object code, or in other machine-readable instructions stored on a machine-readable medium. Some operations need not necessarily be performed by the low power media player 538A, and may be performed by other elements, such as by the low power mode service 520 and/or by the application 556. The various operations need not necessarily be performed in the exact order shown, and some operations can be added, removed, modified, or combined.

In a block 702, a media file is depicted as being played back by the application 556 during the full power mode. For example, a Windows Media Player™ 9 application may be playing back an MP3 audio file while the user of the portable computer 100 is using a word processing program. In an embodiment, the application 556 provides state information to the low power media player 538A during the low power mode at a block 704. In this low power mode, the low power media player 538A is running but is substantially inactive, except to obtain and process the state information, which can include title of the song being played, time remaining to complete its playback, volume, and the like.

At a block 705, the low power mode service 520 is used for monitoring for an event that signals a need to transition to the low power mode. For instance, if the lid of the portable computer is closed, the lid switch 112 can generate an interrupt to signal the transition to the low power mode. If no event is detected at the block 706, then the monitoring continues at the block 705.

However, if an event is detected at the block 706, then the low power mode service 520 performs certain tasks to transition into the low power mode. These tasks include reading the low power mode power profile from the power mode data store 618, and determining which elements of the portable computer 100 to turn OFF, to keep turned ON, when to turn them OFF or ON, in which sequence, duration, and so forth. The appropriate devices, services, processes, and other components are then turned OFF and/or suspended. Embodiments of techniques to monitor for events and to transition into the low power mode are described in detail in U.S. patent application Ser. No. 10/857,628, entitled "METHOD AND APPARATUS FOR OPERATING AN ELECTRONIC DEVICE IN A LOW POWER MODE," filed May 28, 2004, assigned to the same assignee as the present application, and incorporated herein by reference in its entirety.

At a block 710, the low power mode service 520 wakes up or is otherwise used for activating the low power media player 538A, which is running as a background process. At the block 710, the low power mode service 520 may also notify the LPDM application service 524 that the portable computer 100 is transitioning into the low power mode, thereby also waking up the LPDM application service 524, which may have also been previously running in as a background process. After being awakened, the low power media player 538A takes control over the application 556, which is currently playing a song or other media file, and instructs the application 556 to enter an embedded mode at a block 712. In the embedded mode, the application 556 continues to play the song but its user interface becomes hidden.

At a block 714, the low power media player 538A obtains the playlist, titles, artist, volume, and other information from the application 556. In one embodiment, this information is obtained in response to a request sent to the API 544 of the application 556 by the low power media player 538A. In another embodiment, this information can be independently provided by the application 556 without necessarily receiving a request from the low power media player 538A. This information may be read by the low power media player 538A from the library 546. It is noted that in one embodiment, at least some of this information may have been obtained previously at the block 704.

At a block 716, the low power media player 538A establishes a communication with the LPDM application service 524 and provides it with the obtained information, including the playlist. At a block 718, the LPDM application service 524 and/or the low power media player 538A sends the playlist and other information to the LPDM 510 for presentation on the low power display 114.

Continuing to a block 800 in FIG. 8, the low power media player 538A reads the playlist to determine which songs are to be played subsequent to the current song. These songs can be played back in sequence according to the order in the playlist, or can be played out of sequence in accordance with a skip, repeat, or other user-provided sequencing preference. The particular sequence to play back the song can determine which order the corresponding media files are to be read from the hard disk 318 by the low power media player 538A.

The low power media player 538A is used for reading or otherwise obtaining a copy of at least a portion of the media files from the hard disk at a block 802. In one embodiment, the reading at the block 802 comprises a single, or at least a relatively limited number, of disk access operations to locate and obtain all portions of all the desired media files from the hard disk 318. After the media files are read, the hard disk drive 316 and the hard disk 318 are turned OFF.

At a block 804, the media files obtained from the hard disk 318 are cached or otherwise stored or loaded in memory. In an embodiment, the media files are inherently placed in an operating system cache, in the RAM 312, or in some other non-persistent or otherwise volatile storage location in the system memory 306 by the operating system 320 during the reading process at the block 802. Thus, an independent and separate operation is generally not required to cache the media files.

At a block 806 after the application 556 has completed playback of the current song, the application 556 is used for reading and playing back a subsequent song or portion thereof from the cached media files. The application 556 by default first checks the non-persistent storage location for the next song, as opposed to first accessing the hard disk 318. Since the application 556 locates the cached media file(s) in the non-persistent storage location, there will be no need to further access the hard disk 318, unless the cached media file(s) may have been overwritten by a concurrently running application. The located cached media file(s) are read and then played back by the application 556 at the block 806.

At a block 808, the low power mode service 520 monitors for an event that signals a need to transition out of the low power mode. This monitoring can occur as a process separate from the caching and playback, and can include events to signal a need to return to a full power mode or to go to a standby (or other inactive move).

If no event is detected at the block 810, then playback continues at the block 806. Otherwise if an event is detected (such as if the user opens the lid of the portable computer 100 to indicate a need to transition back to the full power mode, or presses a button to turn OFF the portable computer 100), then the low power media player 538A instructs the application 812 to stop playback at a block 812. The portable computer 100 then exits the low power mode at a block 814, and the low power media player 538A reverts to operation as a background process, if appropriate, until reawakened again.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible and can be made without deviating from the spirit and scope of the invention.

For example, while some embodiments have been described in the context of interacting with a Windows XP™ kernel and operating in conjunction with the power states defined in the ACPI specification, the invention is not limited to these specific implementations. Other embodiments may be implemented with electronic devices that use a different operating system and/or that have power states that are defined using some other specification.

Moreover, various embodiments have been described with respect to specific products such as Windows Media Player™ 9 and MP3 formats. These are merely examples of possible implementations, and that other embodiments can provide a low power media player for other formats (including audio and/or video formats different from MP3), or a low power media player usable with other types of media player applications. A separate stand-alone low power media player can also be provided in one embodiment, wherein such a low power media player does not need to rely on functionality provided by some other media player application present in the portable computer 100 and which can cache media files instead of performing repeated disk access operations.

An example has been described above where the low power media player 538A commenced its operation in the low power mode in the middle of an existing playback of a media file by the application 556. The low power media player 538A need not necessarily operate under this condition. The low power media player 538A can commence operation during the low power mode even if the application was not previously (and currently) playing back a media file. A user-entered command from the LPDM 510 can be provided, for example, to signal the low power media player 538A to commence operation in the low power mode to read and cache media files, and control the application 556 to playback these media files (or the low power media player 538A may play back the media files itself in another embodiment).

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method usable for a portable, hand-held electronic device having a single processor that can operate in a low power mode and in a higher power mode relative to the low power mode, the method comprising:
   when the single processor is operating in the higher power mode, operating a media player application in a full power mode to access a plurality of media files in a storage location, wherein at least a full power mode version of the media player application is usable on a desktop or laptop computer, and wherein the portable, hand-held electronic device is sized to fit on a user's hand;
   monitoring for an event representative of a transition to the low power mode from the higher power mode of the single processor;
   if the event is detected, activating a low power media player to operate during the low power mode, wherein the low power media player is separate from the media player application, and wherein the low power media player provides fewer user interface elements than the media player application;
   transitioning the media player application to operate in an embedded mode, wherein the embedded mode consumes less power than the full power mode, and wherein the embedded mode provides a subset of the functions available in the full power mode;
   reading at least a portion of a media file, to be played during the low power mode, from the storage location using the low power media player supported by the single processor operating in the low power mode;
   loading in a memory during the low power mode the portion of the media file read from the storage location using the low power media player supported by the single processor operating in the low power mode;
   playing the loaded portion of the media file from the memory during the low power mode using the single processor operating in the low power mode, wherein the playing the read portion of the media file is performed by the media player application in embedded mode but is controlled by the low power media player.

2. The method of claim 1, further comprising:
   playing the media file when the transition to the low power mode occurs;
   receiving, at the low power media player, information associated with at least one of a plurality of media files stored in the storage location; and
   using the received information to determine which media file to read from the storage location and to load in the memory.

3. The method of claim 2 wherein receiving the information associated with the media files stored in the storage location includes receiving a playlist of the media files.

4. The method of claim 2, further comprising providing the information associated with the media files for presentation on a low power display of the electronic device.

5. The method of claim 1, further comprising keeping the low power media player running in modes different from the low power mode.

6. The method of claim 1 wherein loading the portion of the media file read from die storage location includes storing the portion of the media file in a cache while the portion is read from the storage location.

7. The method of claim 1, further comprising suspending operations of other components of the electronic device during the low power mode to prevent data associated with operation of such components from overwriting the loaded portion of the media file.

8. The method of claim 1, further comprising:
   receiving user-entered commands, directed towards playing of media tiles, from a user interface on a low power display that is located on an outside surface of a lid of the electronic device, wherein the lid can be closed to cover a display screen on an inside surface of the lid to enable operation of the low power display located on the outside surface of the lid; and
   applying the user-entered commands to control, using the low power media player, playing of corresponding media files during the low power mode by a playback function of the media player application.

9. The method of claim 8, further comprising using an application program interface (API) to interact between the media player and the media application, during the low power mode, to control the playback function of the media application.

10. An article of manufacture usable for a portable electronic device, the article of manufacture comprising:
    a machine-readable medium having instructions stored thereon to cause a single processor to operate a media player application of the electronic device in a low power mode of the single processor, wherein at least a full power version of the media player application is usable on a desktop or laptop computer, by:
    when the single processor is operating in a higher power mode, operating the media player application in a full power mode to access a plurality of media files in a first storage location;
    monitoring for an event representative of a transition to the low power mode from the higher power mode of the single processor;
    if the event is detected, activating a low power media player to operate during the low power mode;
    transitioning the media player application to operate in an embedded mode, wherein the embedded mode consumes less power than the full power mode, and wherein the embedded mode provides a subset of the functions available in the full power mode;
    reading, from the first storage location, at least a portion of at least one of the plurality of media files, to be played during the low power mode, the reading being supported by the single processor operating in the low power mode;
    storing during the low power mode the portion of the plurality of media files read from the first storage location in a second storage location, the storing being supported by the single processor operating in the low power mode; and
    playing the stored portion of the plurality of media files from the second storage location during the low power mode, the playing being supported by the single processor operating in the low power mode.

11. The article of manufacture of claim 10 wherein the machine-readable medium further includes instructions stored thereon to substantially minimize access of the first storage location to read media files during the low power mode.

12. The article of manufacture of claim 10 wherein the machine-readable medium further includes instructions stored thereon to obtain information associated with the plurality of media files stored in the first storage location and to provide the obtained information for presentation on a low power display that is located on an outside surface of a lid of the electronic device, wherein the lid can be closed to cover a display screen on an inside surface of the lid to enable operation of the low power display located on the outside surface of the lid.

13. The article of manufacture of claim 12 wherein the machine-readable medium further includes instructions stored thereon to use the obtained information to determine which media files to read from the first storage location and store in the second storage location during playing of a portion of one of the plurality of media files.

14. The article of manufacture of claim 12 wherein the machine-readable medium further includes instructions stored thereon to use an application program interface (API) to interact between the media player application and the low power media player, during the low power mode, to control the playback function of the media player application.

15. A portable, hand-held apparatus that can operate at least one application during a low power mode, the apparatus comprising:
- a portable power supply;
- a single processor having the low power mode and a higher power mode relative to the low power mode;
- a media player application having a full power mode and an embedded mode, wherein the embedded mode consumes less power than the full power mode and provides a subset of the functions available in the full power mode, and wherein at least a full power version of the media player application is usable on a desktop or laptop computer;
- a low power media player application enabled to operate in the low power mode, wherein the low power media player application is separate from the media player application, and wherein the low power media player application provides fewer user interface elements than the media player application;
- a persistent storage location accessible by the low power media player application and that can store a plurality of media files;
- wherein during the high power mode the single processor employs the full power mode of the media player application and accesses the plurality of media files in the persistent storage location;
- a volatile storage location; and
- a housing for at least partially carrying the portable power supply, the single processor, the persistent storage location and the volatile storage location, wherein the housing is sized to be held within a user's hand;
- wherein during the low power mode;
  - the low power media player application as supported by the single processor operating in the low power mode is able to control playing of a first media file, and able to read at least a portion of one other additional media file from the persistent storage location and load that read additional media file in the volatile storage location during playing of the first media file during the low power mode; and
  - the media player application operating in the embedded mode plays the portion of the loaded media file under control of the low power media player application.

16. The apparatus of claim 15 wherein the portion of the additional media file is read from the volatile storage location instead of the persistent storage location after completion of playing of the first media file.

17. The apparatus of claim 15 wherein the low power media player application comprises an audio player application that is substantially inactive, but running, during a full power mode of the single processor.

18. The apparatus of claim 17 wherein the audio player application comprises an MP3 player application.

19. The apparatus of claim 15, further comprising a low power mode service to activate the low power media player application during the low power mode and to control either one or both deactivation and suspension of processes during the low power mode.

20. The apparatus of claim 19 wherein the low power mode service can selectively instruct deactivation of elements during the low power mode after use of such elements by the low power media player application for a particular task.

21. The apparatus of claim 15, further comprising:
- a lid having an inside surface and an outside surface;
- a display screen located on the inside surface of the lid;
- a low power display module having a low power display located on the outside surface of the lid to present data associated with the plurality of media files and to provide user-entered commands to the low power media player application, wherein the lid can be closed to cover the display screen located on the inside surface of the lid to enable operation of the low power display located on the outside surface of the lid.

22. The apparatus of claim 15, further comprising a plurality of application program interfaces (APIs) to allow the low power media player application to communicate with other components in connection with playing the portion of the media file during the low power mode, wherein one of the APIs enables the low power media player application to communicate with the media player application during the low power mode to control the playback function of the low power media player application.

23. The apparatus of claim 15 wherein the volatile storage location comprises a cache.

24. The apparatus of claim 15, further comprising an element to provide the low power media player application with a playlist of media files, the low power media player application capable to use the playlist to determine which portion of the plurality of media files to read and load during playing of a particular media file portion.

* * * * *

UNITED STATES PATENT AND TRADEMARK OFFICE
CERTIFICATE OF CORRECTION

PATENT NO. : 7,426,647 B2
APPLICATION NO. : 10/857627
DATED : September 16, 2008
INVENTOR(S) : Fleck et al.

It is certified that error appears in the above-identified patent and that said Letters Patent is hereby corrected as shown below:

In column 20, line 5, in Claim 6, delete "die" and insert -- the --, therefor.

In column 20, line 15, in Claim 8, delete "tiles" and insert -- files --, therefor.

In column 21, line 58, in Claim 15, delete "mode;" and insert -- mode: --, therefor.

Signed and Sealed this

Sixteenth Day of December, 2008

JON W. DUDAS
*Director of the United States Patent and Trademark Office*